J. M. BEEBE.
Bee Hive.
No. 70,782.  Patented Nov. 12, 1867.
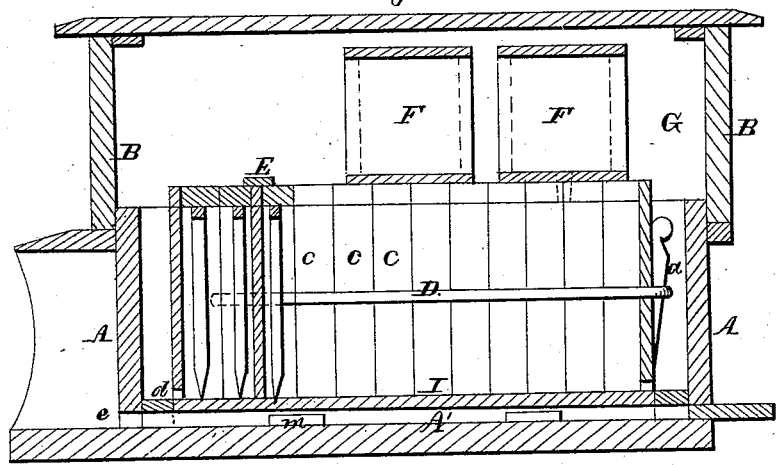
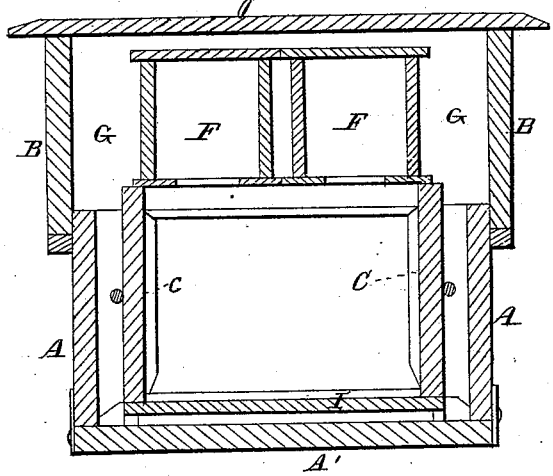
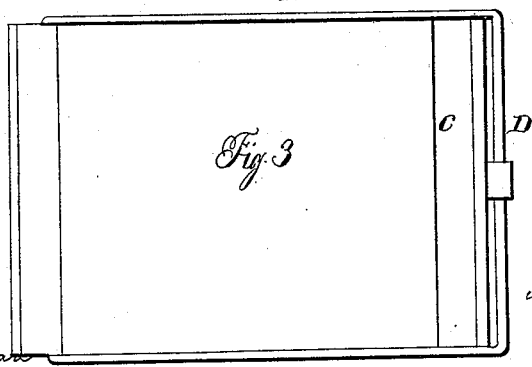

United States Patent Office.

JAMES M. BEEBE, OF CASADAGA, NEW YORK.

Letters Patent No. 70,782, dated November 12, 1867.

IMPROVEMENT IN BEE-HIVES.

The Schedule referred to in these Letters Patent and making part of the same.

TO ALL WHOM IT MAY CONCERN:

Be it known that I, JAMES M. BEEBE, of Casadaga, in the county of Chautauqua, and in the State of New York, have invented certain new and useful Improvements in Bee-Hives; and do hereby declare that the following is a full, clear, and exact description thereof, reference being had to the accompanying drawings, and to the letters of reference marked thereon.

In the annexed drawings, making part of this specification, A represents a rectangular box, which is made without top or bottom, but which sits, when in use, upon a bottom board or bench, A'. A ledge is formed around this box at its upper and outside, and upon this ledge rests a larger and similarly-shaped box B. The box B has a suitable top or cover to protect both boxes from the weather. C C represent a series of frames, which are three-sided, having no bottom, and which are made to fit snugly against each other, being bound together by means of a wire bail, D, and a wedge, a. These frames, when thus bound together, form the hive in which the bees work. Suitable openings are formed or left between such of these frames as it is desirable to have dividing-boards pass down between. E represents one of the dividing-boards in position between two frames. F F represent the surplus-honey boxes, which are placed upon the frames C C. The frames C C are made sufficiently smaller than the box A to allow of an inch or so of air-space on the outside of the frames between them and the box. As the box B is larger than the box A, there is, of course, a greater space between its sides and the surplus-honey boxes than there is between the frames C C and box A. The object in leaving this space is that it may be filled in winter time with straw, or shavings from wood, or such other material as will obviously answer to allow of a circulation of air and absorb the moisture arising from the bees. Moisture arising from the breath and set free by the heat of the bodies of the bees often freezes, and thus many valuable swarms of bees are killed. When a hive is provided, as in this case, with a packing or filling between it and its external covering or box, the bees are not liable to sudden changes of weather, and the moisture being absorbed, cannot freeze around them so as to kill them. A bottom board, I, is placed beneath the frames C C, and slightly elevated from the bottom A', so that bees can pass under it. Bees enter beneath the board I through a passage, e, at the end of the box A, and then pass up from beneath this board through openings m m, and thence through an opening, d, at the bottom and end of the frames, to the frames.

Being aware that straw or other similar substance has been used in a bee-hive, between the comb-frames and the box, I do not claim this device.

What I claim, is—

The series of frames C C, constructed and bound together, as described, when said frames are used within the casing A B, formed, as herein set forth, with honey-boxes F F, space G, bottom board I, and openings e d, the whole constructed, arranged, and used in the manner and for the purposes set forth.

In testimony that I claim the foregoing, I have hereunto set my hand this 10th day of August, 1867.

JAMES M. BEEBE.

Witnesses:
WM. W. PHILLIPS,
GEORGE F. FISHER.